United States Patent [19]

Fujita et al.

[11] Patent Number: 4,910,039

[45] Date of Patent: Mar. 20, 1990

[54] ADDITIVES FOR FROZEN SURIMI

[75] Inventors: Yatsuka Fujita, Nishinomiya; Kunihiko Tomiyasu, Takarazuka; Toshitaka Nakashima, Itami, all of Japan

[73] Assignee: Kabushiki Kaisha Ueno Seiyaku Oyo Kenkyujo, Osaka, Japan

[21] Appl. No.: 183,100

[22] Filed: Apr. 19, 1988

[30] Foreign Application Priority Data

Apr. 24, 1987 [JP] Japan .................................. 62-102342
Dec. 28, 1987 [JP] Japan .................................. 62-333763

[51] Int. Cl.$^4$ .............................................. A23B 4/00
[52] U.S. Cl. ................................... 426/652; 426/643; 426/654; 426/661
[58] Field of Search ............... 426/643, 652, 654, 658, 426/661

[56] References Cited

U.S. PATENT DOCUMENTS 4,454,161 6/1984 Okada .............................. 426/660 X

FOREIGN PATENT DOCUMENTS

| 0075357 | 7/1978 | Japan | 426/643 |
| 0126758 | 10/1979 | Japan | 426/643 |
| 0154560 | 12/1979 | Japan | 426/643 |
| 0034872 | 2/1984 | Japan | 426/643 |
| 0183674 | 10/1984 | Japan | 426/643 |
| 0275671 | 11/1987 | Japan | 426/643 |

OTHER PUBLICATIONS

Lee, *Food Technology*, "Surimi Process Technology", Nov. 1984, pp. 69–80.

*Primary Examiner*—Donald E. Czaja
*Assistant Examiner*—Celine T. Callahan
*Attorney, Agent, or Firm*—Wegner & Bretschneider

[57] ABSTRACT

The present invention provides an additive for frozen surimi containing branched dextrins and a surface active agent for food; the frozen surimi into which the additives for surimi of the present invention are added does not give off a fish smell or a bad smell after thawed, and the fish meat product such as kamaboko, chikuwa and the like which is produced from the frozen surimi has a bad smell.

5 Claims, No Drawings

ADDITIVES FOR FROZEN SURIMI

BACKGROUND OF THE INVENTION

This invention relates to an additive for frozen surimi (ground fish meat) for deodorizing or removing the smell.

Frozen surimi is a product prepared by collecting fish meat from raw fish such as wall-eye pollack to give a picked meat, washing the picked meat with clean water 2 or 3 times or several times in some cases, if necessary, adding a small amount of sodium chloride to the last washing water, removing the black skin by a refiner in case of need, dehydrating by a screw press, mixing the resultant fish meat with a sugar or sugar alcohol and a polyphosphate, packing and freezing the resultant surimi followed by storing at $-20°$ C.$--30°$ C. The frozen surimi is thawed at use and processed to surimi based products such as kamaboko, chikuwa and the like.

Recently, fishing boats often go far away for catching of fish such as walleye pollack because of restriction of fishing grounds. It sometimes needs about 10-14 days from fish catch to landing. As the result, the commercial value of surimi markedly decreases because the freshness becomes remarkably lower and strong smell of walleye pollack is noted. Additionally, freshness of the swarming red meat fish (e.g. mackerel, sardine or jack mackerel) decreases more swiftly compared with the white meat fish such as walleye pollack and bad effects such as remarkably bad color tone, lowering of gel formation ability and strong smell of fish are recognized when the surimi is prepared because of the higher fat content and the more blood-colored meat. The smell of fish is especially so strong that the utility for surimi based products is limited.

As the conventional method for deodorizing or removing the fish smell of surimi of fish meat, there are known a masking method adding perfumes or alcohol extracts of plants or a deodorizing method utilizing a property forming a clathrate compound by cyclodextrin.

The masking agents such as a perfume and the like have a problem of perfume odor or alcohol smell although fish smell disappears. Cyclodextrin is expensive and has a disadvantage that the product gives fish smell when heated.

SUMMARY OF THE INVENTION

The purpose of this invention is to deodorize such an unpleasant fish smell of fish meat surimi.

The unpleasant fish smell of surimi of fish meat can be deodorized by adding branched dextrins with a surface active agent for food among the starch hydrolyzed products used for controlling freezing denaturation.

DETAILED DESCRIPTION OF THE INVENTION

This invention relates to an additive for frozen surimi which comprises branched dextrins and a surface active agent for food.

There are preferably used as the branched dextrin, a branched dextrin of the mean molecular weight of 3,000-500,000, preferably 5,000-100,000, more preferably 10,000-30,000 and a reduced branched dextrin.

A branched dextrin of the molecular weight of smaller than 3,000 and the reduced branched dextrin can't get enough effect controlling fish smell and unpleasant smell which is the purpose of this invention. Besides, a branched dextrin of the mean molecular weight of more than 500,000 and the reduced branched dextrin show the effect controlling the fish smell and the unpleasant smell while the use often results in increase of viscosity of surimi and properties of surimi become bad.

The branched dextrins are prepared by separating and removing glucose and oligosaccharides of a low molecular size from a hydrolyzed product containing straight dextrins, branched dextrins, glucose and oligosaccharides of a low molecular weight and purifying and powdering the part being rich in branched dextrins. The reduced branched dextrin is prepared by hydrogenation of the above branched dextrin.

As method for hydrolyzing starch there are carried out enzymatic decomposition, acid decomposition, thermal decomposition and the like. The products are different from each other in decomposition ratio, content of branched dextrins and the like depending on the kind of starch (e.g. corn starch or rice cake starch), decomposition method, for example, the kind of amylase in the enzymatic decomposition (e.g. $\alpha$-amylase, $\beta$-amylase or glucoamylase), action conditions and the like. The branched dextrins suited for this invention are prepared by applying suitable separation and purification methods to the above products. A practical procedure is, for example, disclosed in Jap. Pat. Laying-open Pub. No. 205494/1986 or "DENPUN KAGAKU HANDBOOK" (Handbook for Starch Chemicals) pp. 64-85 (edited by Jiro Nikuni, published by Asakura Shoten, 1985). The reduction of the branched dextrin is disclosed in Jap. Pat. Pub. No. 18898/1969.

The branched dextrin used in the additive for surimi of this invention is mixed at a ratio of 0.5 weight % or more to fish meat, preferably about 1-3% by weight. The effect aimed by this invention cannot be sufficiently obtained when less than 0.5% by weight is used. The effect is increased by using more than 3% by weight, while the viscosity of the surimi often increases and the properties of the surimi become bad.

The branched dextrin on the market sometimes contains impurities and in that case it should be compounded in the above range depending on the pure content calculated. The branched dextrins in a purity of 85% or more are preferably used since too much of impurities which are mainly glucose, maltose and other straight oligosaccharides sometimes give other effects on surimi.

The surface active agent for food is not specially limited and there are exemplified glycerol fatty acid esters, sucrose fatty acid esters, sorbitan fatty acid esters, propylene glycol fatty acid esters, polyglycerol fatty acid esters, lecithin, polyoxyethylene sorbitan fatty acid esters and their mixture.

The surface active agent for food used as the additive for surimi of this invention is preferably mixed with the fish meat at a ratio of 0.1-1.0% by weight, especially 0.1-0.5% by weight. The effect of addition of the surface active agent is not recognized when the ratio is less than 0.05%. Addition of more than 1.0% by weight is not expected to give a stronger effect but there is rather possibility of decrease of elasticity.

Therefore, the ratio of the branched dextrins and the surface active agent for food is suitably 1-20 parts by weight of the latter, preferably 3-20 parts by weight, based on 100 parts by weight of the former.

The surface active agent for food may be used alone or as a mixture with fats and oil. It is preferred that the total amount of the surface active agent for food and the fats and oil is in the above range when fats and oil are used. The surface active agent for food and the fats and oil are preferably used by dispersing in a sugar or sugar alcohol. As the sugar or the sugar alcohol, there are used, for example, glucose, maltose, sucrose, lactose, maltitol, sorbitol and the like.

There are exemplified triglycerides of a fatty acid, esters of a higher fatty acid with a higher alcohol as the fats and oil and the former is especially preferred. Practically, vegetable fats and oil such as rapeseed oil, soybean oil, cotton seed oil, rice barn oil, corn oil, olive oil, groundnut oil, palm oil and the like and animal fats and oil such as beef oil, lard, fish oil and the like are exemplified.

Besides, the surface active agent for food and optionally the fats and oil may be added, for example, in the emulsified state of O/W or by dissolving or dispersing in an edible solvent such as ethanol or propylene glycol, if they can be swiftly dispersed into surimi homogeneously.

The additive for surimi of this invention may be prepared in the form of one pack by mixing previously the branched dextrins with the surface active agent for food optionally containing the fats and oil or in the form of two packs by putting each of the branched dextrins and the surface active agent for food optionally containing fats and oil into a separate container. Furthermore, it may be prepared in a three pack-form by putting the fats and oil alone into a separate container when the surface active agent for food contains fats and oil.

The additive for surimi of this invention may contain a sugar or a sugar alcohol when it is used as an additive in a one pack-form, which is rather preferred.

The additive for surimi of this invention in a two pack- or a three pack-form may contain a sugar or a sugar alcohol with other components of each pack. Furthermore, the sugar or sugar alcohol may be sealed in another bag as an independent pack. Besides, the surface active agent for food and the fats and oil are preferably used with the sugar or sugar alcohol.

The additive for surimi of this invention is added and mixed before preparation of frozen surimi. Adding method, order, timing and mixing method are not especially limited and can be used for any of non-salted surimi, salted surimi and surimi without phosphorous.

The additive of this invention is applicable to the fish meat of walleye pollack, atka mackerel, sardine, mackerel, Pacific herring, Pacific saury, cutlassfish, pike eel, righteye flounder, jack mackerel, melulusa and the mixture although it is not limited to these examples.

Additionally, the additive for frozen surimi of this invention may be compounded with other improving agents, for example, a freezing denaturation preventing agent (e.g. polyphosphate) and an elastisity improving agent (e.g. gluten, soybean protein, egg protein, milk protein or blood plasma).

This invention is further explained in detail with examples.

EXAMPLE 1

Dehydrated fish meat was prepared from walleye pollack landed 12 days after the catching and after being made to contain water to a certain amount by previous mixing, the meat (5 kg) in each group was mixed with the additive in Table 1 and blended to be homogeneous by a small silent cutter for 5 minutes. The resultant surimi (2.5 kg) each was put into a bag made of polyethylene film, frozen at $-30°$ C. overnight by an air-blast freezer to give frozen surimi and then stored at $-30°$ C.

Three months after from the freezing the frozen surimi (2.5 kg) in each group were taken out and thawed naturally by leaving in a room overnight. The surimi (2 kg) was put into a small silent cutter, blended with 3 weight % of sodium chloride and 5 weight % of potato starch for 13 minutes, packed into a polychlorovinylidene film and then heated in a hot water of 90° C. to give kamaboko.

A sensory test (observation of the state and smell of the surimi) and measurement of Hunter whiteness were carried out with the surimi and the kamaboko. Besides, Hunter whiteness was measured by a color difference meter in ND-101DP type (available from Nihon Denshoku Kogyo).

TABLE 1

| Test No. | | Additive (weight %) | | | | Hunter Whiteness Degree (%) | | State of | Smell | |
|---|---|---|---|---|---|---|---|---|---|---|
| | | Sugar | *1 | *2 | *3 | Poly Phosphate | Surimi | Kamaboko | Surimi | Surimi | Kamaboko |
| 1 | Ref. Ex. | 6 | 0 | 0 | 0 | 0.3 | 18.0 | 48.0 | Skin is coarse and dark | Fish smell is strong, Unpleasant smell is strong | Fish smell is strong, Unpleasant smell is strong |
| 2 | Ref. Ex. | 4 | 2 | 0 | 0 | 0.3 | 19.4 | 49.8 | Skin is fine and white with transparency | Fish smell is present, Unpleasant smell is present | Fish smell is present, Unpleasant smell is present |
| 3 | Ref. Ex. | 4 | 0 | 0 | 2 | 0.167 | 20.1 | 50.1 | Skin is fine and light white | Fish smell is present, Unpleasant smell is present | Fish smell is present, Unpleasant smell is present |
| 4 | Ex. | 2 | 2 | 0 | 2 | 0.167 | 21.2 | 51.5 | Skin is fine and light white with transparency | Fish smell is little, Unpleasant smell is not present | Fish smell is little, Unpleasant smell is not present |
| 5 | Ex. | 2 | 0 | 2 | 2 | 0.167 | 21.4 | 51.8 | Skin is fine and light white with | Fish smell is little, | Fish smell is little, |

TABLE 1-continued

| Test No. | Additive (weight %) | | | | Hunter Whiteness Degree (%) | | State of Surimi | Smell | |
|---|---|---|---|---|---|---|---|---|---|
| | Sugar | *1 | *2 | *3 | Poly Phosphate | Surimi | Kamaboko | Surimi | Kamaboko |
| | | | | | | | | transparency | Unpleasant smell is not present | Unpleasant smell is not present |

*1 Branched dextrin (mean molecular weight 10,000, containing ratio 85–90%) (product of Sanmatsu Co., & Ltd)
*2 Reduced Branched dextrin, the hydrogenated product of *1
*3 Composition, powder consisting of 83.3% sorbit 10% a glycerol fatty acid ester (monoglyceride from cotton seed oil and 6.7% polyphosphate)
Ref. Ex. indicates a comparative example.
Ex. indicates an example of the present invention.

From the results in Table 1, the following effects are recognized. The product of this invention hardly has smell of walleye pollack and unpleasant smell is not noted. The surimi has fine skin and is light white with transparency and gloss. The quality of the surimi is markedly improved. Furthermore, the kamaboko prepared from the surimi hardly has smell of walleye pollack and unpleasant smell has disappeared. The skin is fine and light white with gloss. On the other hand, the surimi in Reference Example 1 has strong smell of walleye pollack and strong unpleasant smell is noted. The color tone is dark. The skin of the kamaboko is a little coarse and dark white without gloss.

EXAMPLE 2

Frozen surimi in the composition shown in Table 2 was prepared in the same manner as in Example 1 and kamaboko was prepared in the same manner as in Example 1 using the surimi after keeping at −30° C. for 3 months.

Besides, the composition was prepared by homogeneously dispersing each of monoglyceride of cotton seed oil, sorbitan monooleate, a sucrose fatty acid ester (HLB15) and polyethylene glycol monooleate in melted sorbitol by a mixer, cooling to cake, crystallizing and then grinding. It comprises 90% of sorbitol and 10% of each surface active agent. The composition comprising 90% of sorbitol, 4% of monoglyceride of cotton seed oil, 3% of sorbitan monooleate and 3% cotton seed oil was prepared in the same manner as noted above.

The results concerning the surimi and the kamaboko are shown in Table 2. The methods for measurement are the same as in Example 1.

TABLE 2

| Test No. | | Kind of Surface Active Agent | Additive (weight %) | | | | | Smell | |
|---|---|---|---|---|---|---|---|---|---|
| | | | Sugar | *1 | *2 | *3 | Poly Phosphate | Surimi | Kamaboko |
| 1 | Ref. Ex. | | 6 | 0 | 0 | 0 | 0.3 | Fish smell is strong, Unpleasant smell is strong | Fish smell is strong, Unpleasant smell is strong |
| 2 | Ex. | Monoglyceride of | 2 | 2 | 0 | 2 | 0.3 | Fish smell is little, Unpleasant smell is not present | Fish smell is little, Unpleasant smell is not present |
| 3 | Ex. | Sorbitan monooleate | 2 | 2 | 0 | 2 | 0.3 | Fish smell is little, Unpleasant smell is not present | Fish smell is little, Unpleasant smell is not present |
| 4 | Ex. | Sucrose fatty acid ester | 2 | 2 | 0 | 2 | 0.3 | Fish smell is little, Unpleasant smell is not present | Fish smell is little, Unpleasant smell is not present |
| 5 | Ex. | Propylene glycol | 2 | 2 | 0 | 2 | 0.3 | Fish smell is little, Unpleasant smell is not present | Fish smell is little, Unpleasant smell is not present |
| 6 | Ex. | Monoglyceride of cotton Seed oil Sorbitan monooleate Cotton Seed Oil | 2 | 2 | 0 | 2 | 0.3 | Fish smell is little, Unpleasant smell is not present | Fish smell is little, Unpleasant smell is not present |
| 7 | Ex. | Monoglyceride of Cotton Seed oil | 2 | 0 | 2 | 2 | 0.3 | Fish smell is little, Unpleasant smell is not | Fish smell is little, Unpleasant smell is not |

TABLE 2-continued

| Test No. | Kind of Surface Active Agent | Additive (weight %) | | | | | Smell | |
|---|---|---|---|---|---|---|---|---|
| | | Sugar | *1 | *2 | *3 | Poly Phosphate | Surimi | Kamaboko |
| | | | | | | | present | present |

*1 Branched dextrin (mean molecular weight 10,000, containing ratio 85-90%) (Product of Sanmatsu Kogyo Co., & Ltd)
*2 Reduced Branched dextrin, the hydrated product of *1
*3 Composition
Ref. Ex. indicates a comparative example.
Ex. indicates an example of the present invention.

As shown in Table 2, it is recognized in the groups (Nos. 2-6) of this invention that smell of walleye pollack in the surimi and kamaboko is hardly present and unpleasant smell is not felt when the branched dextrin and each of the surface active agent are used together. Additionally, the color tone of each of the surimi in the groups (Nos. 2-6) of this invention is light white with transparency. The effect improving quality of surimi is notable. Among the surface active agents, monoglyceride of cotton seed oil gives good effect followed by sorbitan monooleate.

EXAMPLE 3

Frozen surimi having the composition shown in Table 3 was prepared in the same manner as in Example 1 and Kamaboko was prepared in the same manner as in Example 1 using the surimi after storage at −30° C. for 3 months.

Besides, the composition is prepared by dispersing homogeneously a glycerol fatty acid ester (monoglyceride from cotton seed oil) in melted sorbitol by a mixer, cooling to cake, crystallizing and then grinding. It consists of 90% of sorbitol and 10% of a glycerol fatty acid ester. The results concerning the surimi are shown in Table 3. The evaluation standard in the sensory test concerning surimi and kamaboko is as follows:

A: Smell of walleye pollack and unpleasant smell are hardly present,
B: Smell of walleye pollack and unpleasant smell become weak.
C: Smell of walleye pollack and unpleasant smell become a little weak.
D: Smell of walleye pollack and unpleasant smell are strong.

TABLE 3

| Test. No. | | Additive (Weight %) | | | | Smell | |
|---|---|---|---|---|---|---|---|
| | | *1 | *3 | Sugar | *4 | Surimi | Kamaboko |
| 1 | Ref. Ex. | | 0 | 6 | | D | D |
| 2 | " | | 0.5 | 5.5 | D | D | D |
| 3 | " | 0 | 1 | 5 | 0.3 | D | D |
| 4 | " | | 2 | 4 | | D | D |
| 5 | " | | 3 | 3 | | D | D |
| 6 | Ref. Ex. | | 0 | 5.5 | | D | D |
| 7 | " | | 0.5 | 5 | | D | D |
| 8 | Ex. | 0.5 | 1 | 4.5 | 0.3 | C | C |
| 9 | " | | 2 | 3.5 | | B | B |
| 10 | " | | 3 | 2.5 | | B | B |
| 11 | Ref. Ex. | | 0 | 5 | | D | D |
| 12 | Ex. | | 0.5 | 4.5 | | C | C |
| 13 | " | 1 | 1 | 4 | 0.3 | B | B |
| 14 | " | | 2 | 3 | | B | B |
| 15 | " | | 3 | 2 | | A | A |
| 16 | Ref. Ex. | | 0 | 4 | | D | D |
| 17 | Ex. | | 0.5 | 3.5 | | B | B |
| 18 | " | 2 | 1 | 3 | 0.3 | B | B |
| 19 | " | | 2 | 2 | | A | A |
| 20 | " | | 3 | 1 | | A | A |
| 21 | Ref. Ex. | | 0 | 3 | | D | D |
| 22 | Ex. | | 0.5 | 2.5 | | B | B |
| 23 | " | 3 | 1 | 2 | 0.3 | A | A |
| 24 | " | | 2 | 1 | | A | A |

TABLE 3-continued

| Test. No. | Additive (Weight %) | | | | Smell | |
|---|---|---|---|---|---|---|
| | *1 | *3 | Sugar | *4 | Surimi | Kamaboko |
| 25 " | | 3 | 0 | | A | A |

*1 Branched dextrin
*3 Composition
*4 Polyphosphate
Ref. Ex. indicates a comparative example
Ex. indicates an example of the present invention The evaluation concerning the results shown in Table 3 is arranged in relation to each addition amount of the branched dextrin and the composition. The result is shown in Table 4.

TABLE 4

| Blanched Dextrin Composition | 0 | 0.5 | 1 | 2 | 3 |
|---|---|---|---|---|---|
| 0 | D | D | D | D | D |
| 0.5 | D | D | C | B | B |
| 1 | D | C | B | B | A |
| 2 | D | B | B | A | A |
| 3 | D | B | A | A | A |

It is recognized from Table 3 that the smell of walleye pollack and the unpleasant smell disappear by using a branched dextrin and a composition of a glycerol fatty acid ester together.

Additionally it is recognized from Table 4 that use of 0.5% by weight or more of a branched dextrin together with 1% by weight or more of a composition or 1% by weight of a branched dextrin together with 0.5% by weight or more of a composition makes smell of walleye pollack and unpleasant smell disappear.

EXAMPLE 4

Frozen surimi having the composition shown in Table 5 was prepared in the same manner as in Example 3 and kamaboko was prepared in the same manner as in Example 1 by using the surimi after storage at −30° C. for 3 months. Evaluation was carried out in the same manner as in Example 3.

As the result, the reduced branched dextrin was recognized to give a little stronger deodorizing effect than the branched dextrin.

TABLE 5

| Test. No. | | Additive (Weight %) | | | | Smell | |
|---|---|---|---|---|---|---|---|
| | | *2 | *3 | Sugar | *4 | Surimi | Kamaboko |
| 1 | Ref. Ex. | | 0 | 6 | | D | D |
| 2 | " | | 0.5 | 5.5 | | D | D |
| 3 | " | 0 | 1 | 5 | 0.3 | D | D |
| 4 | " | | 2 | 4 | | D | D |
| 5 | " | | 3 | 3 | | D | D |
| 6 | Ref. Ex. | | 0 | 5.5 | | D | D |
| 7 | " | | 0.5 | 5 | | D | D |
| 8 | Ex. | 0.5 | 1 | 4.5 | 0.3 | C | C |
| 9 | " | | 2 | 3.5 | | B | B |
| 10 | " | | 3 | 2.5 | | A | A |
| 11 | Ref. Ex. | | 0 | 5 | | D | D |

TABLE 5-continued

| Test. No. | *2 | *3 | Sugar | *4 | Smell Surimi | Kamaboko |
|---|---|---|---|---|---|---|
| 12 Ex. |  | 0.5 | 4.5 |  | B | B |
| 13 " | 1 | 1 | 4 | 0.3 | B | B |
| 14 " |  | 2 | 3 |  | A | A |
| 15 " |  | 3 | 2 |  | A | A |
| 16 Ref. Ex. |  | 0 | 4 |  | D | D |
| 17 Ex. |  | 0.5 | 3.5 |  | B | B |
| 18 " | 2 | 1 | 3 | 0.3 | A | A |
| 19 " |  | 2 | 2 |  | A | A |
| 20 " |  | 3 | 1 |  | A | A |
| 21 Ref. Ex. |  | 0 | 3 |  | D | D |
| 22 Ex. |  | 0.5 | 2.5 |  | A | A |
| 23 " | 3 | 1 | 2 | 0.3 | A | A |
| 24 " |  | 2 | 1 |  | A | A |
| 25 " |  | 3 | 0 |  | A | A |

*2 Reduced branched dextrin
*3 Composition
*4 Polyphosphate
Ref. Ex. indicates a comparative example.
Ex. indicates an example of the present invention.

What is claimed is:

1. An additive for frozen surimi which comprises branched dextrins and a surface active agent in a ratio of 100 parts by weight of the branched dextrins to 1-200 parts by weight of the surface active agent and a sugar or sugar alcohol in a sufficient quantity to deodorize or remove fish smell from surimi fish meat.

2. The additive for frozen surimi of claim 1, in which the branched dextrins are branched dextrins having a mean molecular weight of 3,000-500,000.

3. The additive for frozen surimi of claim 1, in which the surface active agent is selected from the group consisting of a fatty acid monoglyceride, a fatty acid diglyceride, a polyglycerol fatty acid ester, a sorbitan fatty acid ester, a sucrose fatty acid ester, propylene glycol fatty acid ester and lecithin.

4. The additive for frozen surimi of claim 1, in which fats and oil are contained additionally.

5. The additive for frozen surimi of claim 1, in which the branched dextrins are reduced branched dextrins having a mean molecular weight of 3,000-500,000.

* * * * *